United States Patent
Schat

(10) Patent No.: US 11,762,993 B2
(45) Date of Patent: Sep. 19, 2023

(54) SECURING CRYPTOGRAPHIC OPERATIONS FROM SIDE CHANNEL ATTACKS USING A CHAOTIC OSCILLATOR

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 50 days.

(21) Appl. No.: 17/301,679

(22) Filed: Apr. 12, 2021

(65) Prior Publication Data

US 2022/0327209 A1   Oct. 13, 2022

(51) Int. Cl.
| | | |
|---|---|---|
| G06F 21/55 | (2013.01) | |
| G06F 21/57 | (2013.01) | |
| H03L 7/099 | (2006.01) | |

(52) U.S. Cl.
CPC .......... *G06F 21/556* (2013.01); *G06F 21/554* (2013.01); *G06F 21/577* (2013.01); *H03L 7/0991* (2013.01)

(58) Field of Classification Search
CPC ..... G06F 21/556; G06F 21/554; G06F 21/577
See application file for complete search history.

(56) References Cited

U.S. PATENT DOCUMENTS

| | | | |
|---|---|---|---|
| 10,019,571 B2 | 7/2018 | Teper et al. | |
| 2006/0158365 A1* | 7/2006 | Kernahan | H03M 1/38 341/155 |
| 2007/0069827 A1* | 3/2007 | Haiut | H03L 1/026 331/57 |
| 2007/0230650 A1* | 10/2007 | Roethig | H03L 7/0996 375/376 |
| 2008/0211561 A1* | 9/2008 | Kurokawa | G06F 7/68 327/291 |
| 2017/0244546 A1* | 8/2017 | Stark | H04L 9/002 |
| 2017/0262630 A1* | 9/2017 | Teper | G09C 1/00 |
| 2019/0303105 A1* | 10/2019 | Pitu | G06F 7/584 |

OTHER PUBLICATIONS

Aguilar Angulo, Julio A. et al.; "Discrete Chaos-Based Random Number Generator"; 2014 IEEE Faible Tension Faible Consommation (FTFC), May 4-6, 2014, Monaco, Monaco; DOI:10.1109/FTFC.2014.6828610.

(Continued)

*Primary Examiner* — Dao Q Ho
(74) *Attorney, Agent, or Firm* — Daniel D. Hill

(57) ABSTRACT

A device for providing side-channel protection to a data processing circuit is provided and includes a chaotic oscillator and a counter. The data processing circuit has an input for receiving an input signal, a power supply terminal, and an output for providing an output signal. The chaotic oscillator circuit has an input coupled to receive a control signal, and an output coupled to provide an output signal for controlling a voltage level of a power supply voltage of the data processing circuit. The counter has an input coupled to receive a clock signal, and an output coupled to control a variable parameter of the chaotic oscillator in response to the clock signal. In another embodiment, a method is provided providing the side-channel protection to the device.

20 Claims, 4 Drawing Sheets

(56) References Cited

OTHER PUBLICATIONS

Chen, Mo et al.; "Hidden Dynamics and Multi-Stability in an Improved Third-Order Chua's Circuit;" Published in the Journal of Engineering; Received Sep. 13, 2015, Accepted Sep. 29, 2015.
Das, Debayan et al.; "High Efficiency Power Side-Channel Attack Immunity Using Noise Injection in Attenuated Signature Domain"; 2017 IEEE International Symposium on Hardware Oriented Security and Trust (HOST 2017); May 1-5, 2017, McLean, Virginia.
Das, Debayan et al.; "X-DeepSCA: Cross-Device Deep Learning Side Channel Attack"; 2019 56th ACM/IEEE Design Automation Conference (DAC), Jun. 2-6, 2019, Las Vegas, Nevada.
De Mulder, Elke et al.; "Identifying and Eliminating Side-Channel Leaks in Programmable Systems"; IEEE Design and Test; Date of Publication Oct. 24, 2017; Date of Current Version Feb. 2, 2018.
Dhavlle, Abhijitt et al.; "Work-in-Progress: Sequence-Crafter: Side-Channel Entropy Minimization to Thwart Timing-based Side-Channel Attacks"; CASES'19 Companion, Oct. 13-18, 2019, New York, NY; https://doi.org/10.1145/3349569.3351543.
He, Yan et al.; "A 65nm Edge-Chasing Quantizer-Based Digital LDO Featuring 4.58ps-FoM and Side-Channel Attack Resistance"; 2020 IEEE International Solid-State Circuits Conference (ISSCC 2020); Feb. 17-21, 2020, San Francisco, California.
Kundu, Somnath et al.; "A Fully Integrated 40pF Output Capacitor Beat-Frequency-Quantizer-Based Digital LDO with Built-In Adaptive Sampling and Active Voltage Positioning"; 2018 IEEE International Solid-State Circuits Conference; Feb. 11-15, 2018, San Francisco, California.
Le, Thanh-Ha et al.; "Noise Reduction in Side Channel Attack Using Fourth-Order Cumulant"; IEEE Transactions on Information Forensics and Security, vol. 2, No. 4, Dec. 2007.
Majumder, Badruddoja Md, et al.; "Chaos Computing for Mitigating Side Channel Attack"; 2018 IEEE International Symposium on Hardware Oriented Security and Trust (HOST); Apr. 30-May 4, 2018, Washington, D.C.; DOI:10.1109/HST.2018.8383903.
Ors, Siddika Berna et al.; "Power-Analysis Attack on an Asic AES implementation"; Proceedings of the International Conference on Information Technology: Coding and Computing (ITCC'04); Apr. 5-7, 2004, Las Vegas, Nevada; DOI:10.1109/ITCC.2004.1286409.
Prouff, Emmanuel et al.; Statistical Analysis of Second Order Differential Power Analysis: IEEE Transactions on Computers, vol. 58, No. 6, Jun. 2009.
Sarno, Thomas et al.; "Electromagnetic Analysis Perturbation using Chaos Generator"; 6th Conference on Trustworthy Manufacturing and Utilization of Secure Devices (TRUDEVICE 2016), Nov. 14-16, 2016; Barcelona, Spain.
Singh, Arvind et al.; "A 128b AES Engine with Higher Resistance to Power and Electromagnetic Side-Channel Attacks Enabled by a Security-Aware Integrated All-Digital Low-Dropout Regulator"; 2020 IEEE International Solid-State Circuits Conference, Session 25, Circuits Enabling Security; Feb. 17-21, 2020, San Francisco, California.
Stavrinides, S.G. et al.; "A Digital Nonautonomous Chaotic Oscillator Suitable for Information Transmission"; IEEE Transactions on Circuits and Systems—II: Express Briefs; Dec. 11, 2013; DOI: 10.1109/TCSII.2013.2293908.
Zaccaria, Vittorio et al.; "Spectral Features of Higher-Order Side-Channel Countermeasures"; IEEE Transactions on Computers, vol. 67, No. 4, Apr. 2018.
Iftene, Emanuel-Florin et al.; "Protecting the Code Against Side Attacks Using Chaotically Controlled Clock and Supply"; Proceedings of the International Conference on Electronics, Computers And Artificial Intelligence—ECAI-2013; Jun. 27, 2013; DOI: 10.1109/ECAI.2013.6636176.
Singh, Arvind et al.; "Enhanced Power and Electromagnetic SCA Resistance of Encryption Engines via a Security-Aware Integrated All-Digital LDO"; IEEE Journal of Solid-State Circuits (vol. 55, Issue: 2, Feb. 2020); Date of Publication: Oct. 28, 2019; DOI: 10.1109/JSSC.2019.2945944.

* cited by examiner

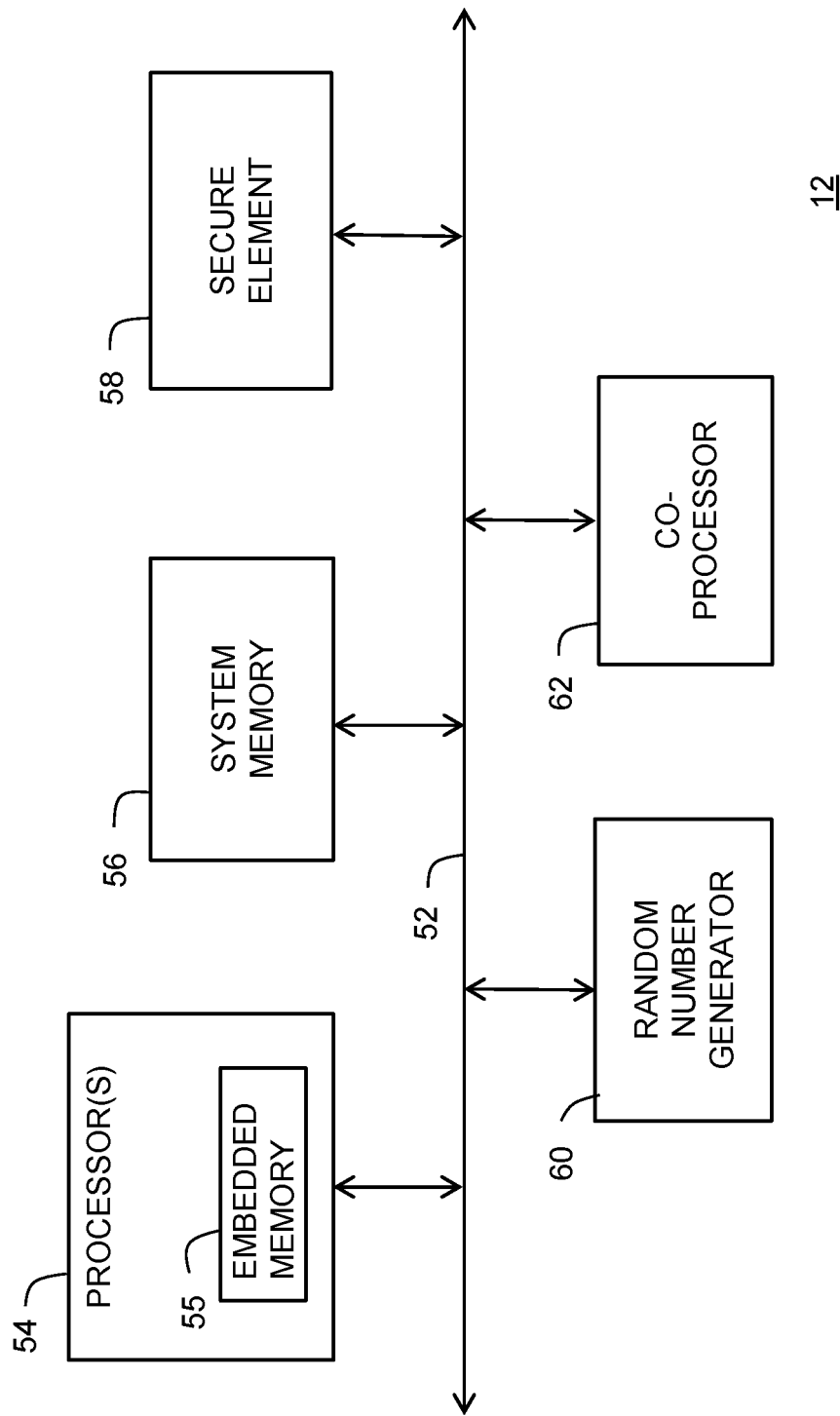

SECURING CRYPTOGRAPHIC OPERATIONS FROM SIDE CHANNEL ATTACKS USING A CHAOTIC OSCILLATOR

BACKGROUND

Field

This disclosure relates generally to data security, and more particularly, to securing cryptographic operations using a chaotic oscillator.

Related Art

When cryptographic operations are performed in an integrated circuit (IC), emissions such as electromagnetic emissions and current consumption can show characteristic features known as side-channel signals. Analysis of the side-channel signals can reveal sensitive information about the IC such as secret keys. Attackers are continuously developing new side channel attacks.

Therefore, a method and circuit are desirable to provide effective protection against these types of attacks for a cryptographic operation.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates the cryptographic circuit of the device of FIG. 1 in accordance with an embodiment.

DETAILED DESCRIPTION

Figure 1:
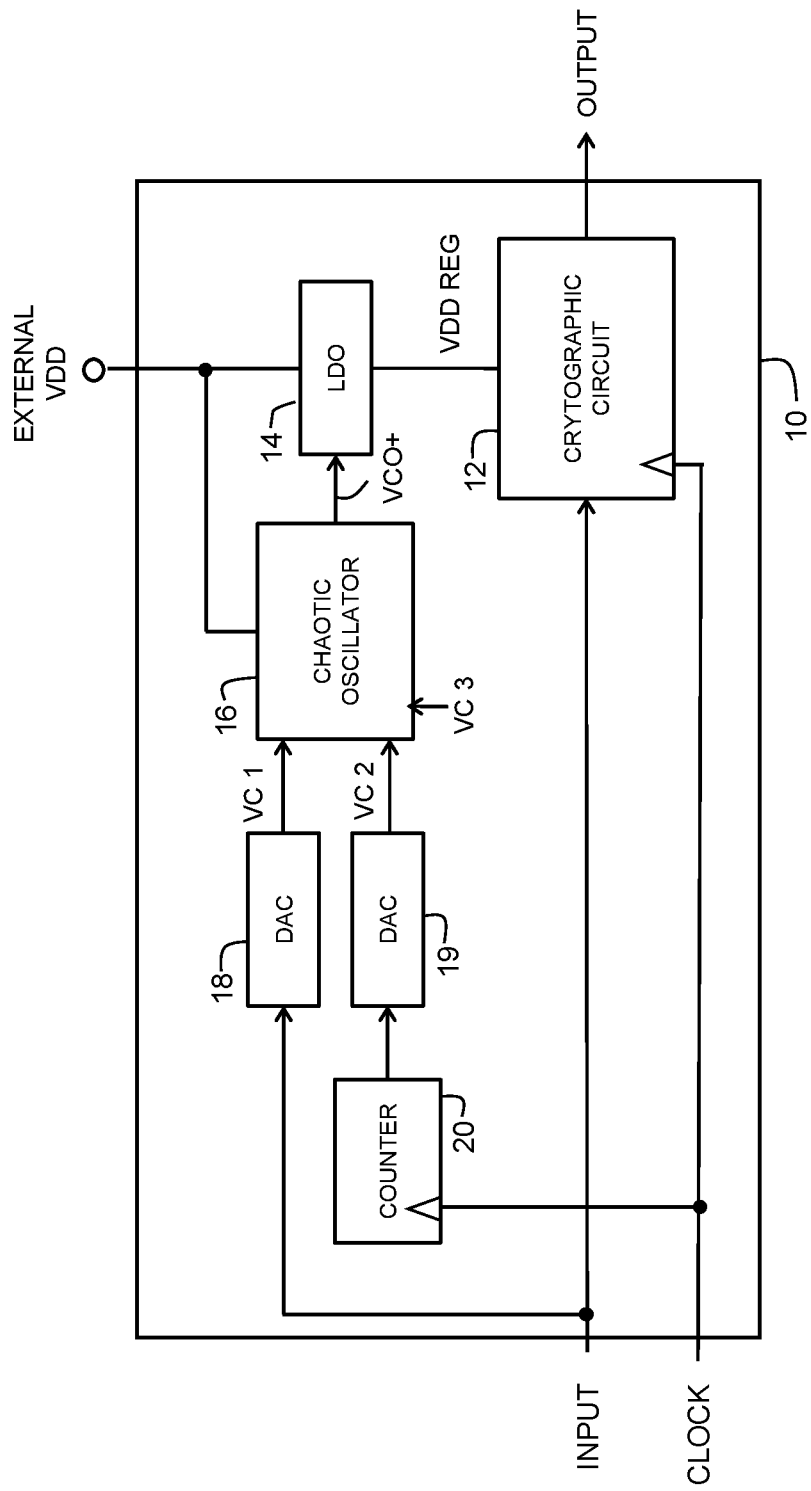
FIG. 1 illustrates a device in accordance with an embodiment.

Generally, there is provided, a device and a method for defending against a side-channel attack. In one embodiment, the device includes a chaotic oscillator, a low dropout voltage regulator, and a counter. A chaotic oscillator is an example of an oscillator circuit that produces a waveform with a pattern that ideally never repeats, at least for a very long time. An input signal for a cryptographic circuit may be overlaid, or modulated, with a signal from the chaotic oscillator to prevent an attacker from being able to decode the overlaid signal. To further confuse the output of the chaotic oscillator, a counter is provided to provide a counter value. The counter value is used to change one or more parameters of the cryptographic circuit to make sure an output of the chaotic oscillator circuit provides a non-repeating waveform. In one embodiment, the counter value is used with a digital to analog converter (DAC) to change the digital counter value of the counter to an analog control voltage that varies with each new clock cycle. In another embodiment, the input signal to the cryptographic circuit may be provided to another DAC to produce another analog control voltage to vary another parameter of the chaotic oscillator. In another embodiment, an output signal of the chaotic oscillator may be provided to an LDO regulator that is used as a reference to control the power supply voltage of the cryptographic circuit. The varying output signal of the chaotic oscillator causes an output voltage of the LDO regulator to be determined by the chaotic oscillator. Varying the power supply voltage helps to prevent an attacker from learning useful information from power supply variations.

In accordance with an embodiment, there is provided, a device including: a data processing circuit having an input for receiving an input signal, a power supply terminal, and an output for providing an output signal; a chaotic oscillator circuit having an input coupled to receive a control signal, and an output coupled to provide an output signal for controlling a voltage level of a power supply of the data processing circuit; and a counter having an input coupled to receive a clock signal, and an output coupled to control a variable parameter of the chaotic oscillator. The device may further include a digital-to-analog converter having an input coupled to the output of the counter, and an output coupled to control the predetermined parameter. The variable parameter may be a resistance of a circuit element of the chaotic oscillator circuit. The variable parameter may be a gain of an amplifier of the chaotic oscillator circuit. The device may further include a low dropout voltage regulator having an input coupled to the output of the chaotic oscillator, and an output coupled to the power supply voltage terminal of the data processing circuit. The data processing circuit may be one of either an encryption or decryption circuit, an encoding or decoding circuit, a verification circuit, or a digital rights management processor. The data processing circuit may operate only in response to a cryptographic key. The device may be implemented in one or more integrated circuits. The chaotic oscillator circuit may be an analog chaotic oscillator circuit.

In accordance with another embodiment, there is provided, an integrated circuit device, including: a data processing circuit having an input for receiving an input signal, a power supply terminal, and an output for providing an output signal; a chaotic oscillator circuit having an input coupled to receive a control signal, and an output coupled to provide an output signal for controlling a voltage level of a power supply of the data processing circuit; a counter having an input coupled to receive a clock signal, and an output; and a first digital to analog converter having an input coupled to the output of the counter, and an output coupled to control a first variable parameter of the chaotic oscillator. The integrated circuit device may further include a second digital to analog converter having an input coupled to receive the input signal of the data processing circuit, and an output coupled to control a second variable parameter of the chaotic oscillator. The first variable parameter includes a resistance of a circuit element of the chaotic oscillator. The first variable parameter may include a gain of an amplifier of the chaotic oscillator. The data processing circuit may be one of either an encryption or decryption circuit, an encoding or decoding circuit, a verification circuit, or a digital rights management processor. The integrated circuit device may further include a low dropout voltage regulator having an input coupled to the output of the chaotic oscillator, and an output coupled to provide the power supply to the data processing circuit.

In yet another embodiment, there is provided, a method including: controlling at least in part, using a chaotic oscillator, a power supply voltage provided to a data processing circuit; counting a plurality of clock signals provided to the data processing circuit; providing a count value for each subsequent counted clock cycle of the plurality of clock signals; converting each count value to an analog value; and providing the analog value to control a variable parameter of the chaotic oscillator. The variable parameter may be a resistance of a circuit element of the chaotic oscillator circuit. The variable parameter may be a gain of an amplifier of the chaotic oscillator circuit. The method may further include providing the power supply voltage with a low dropout voltage regulator having an input coupled to an output of the chaotic oscillator, and an output coupled to a power supply voltage terminal of the data processing circuit. The method may be performed using one or more integrated circuit devices.

In a side-channel attack on a cryptographic circuit, the attacker may try to control the data input and capture the side-channel information corresponding to the data input to allow an attacker to learn sensitive information being protected by the cryptographic circuit. The data input may be, for example, a challenge word in a challenge-response authentication handshake. The attacker is assumed to have physical access to the IC and can apply as many inputs as needed to capture the side-channel information. The side-channel information may be for example the power consumption of the device as a function of the input data and the number of applied clock cycles. Applying the same input data several times may enable the attacker to average out any random noise that was overlaid with the side-channel signal and read the response. A secret that is to be protected by the overlaid side-channel signal may be a cryptographic key. The secret is assumed to be unreachable by the attacker by reverse-engineering the netlist, for example, because it is generated by, for example, a physically unclonable function (PUF). In some prior art systems, the overlaid side-channel signal is deterministic and dependent upon the data input. If the attacker can learn the secret data dependency, the attacker can acquire access to the device. However, in accordance with an embodiment, the overlaid side-channel signal is created using a chaotic oscillator. In the described embodiments, certain parameters that control waveform properties are controlled. For example, one or both of a clock counter and input data of the cryptographic circuit are used to control the chaotic oscillator. Also, in one embodiment, a gain of an amplifier in the chaotic oscillator is varied. The waveform of a chaotic oscillator depends on very small variations of parameters of the oscillator's circuit elements. Even if the attacker can measure the analog parameters of the oscillator with high accuracy, the measurement will not help the attacker build a model of the chaotic oscillator that allows a prediction of the chaotic oscillator's signal shape for a given digital control signal. Therefore, the use of a chaotic oscillator to provide the overlaid signal prevents an attacker from modelling the side-channel signal and then subtracting it out.

To efficiently defy a side-channel attack, the overlaid signal needs to be dependent on many parameters to make it difficult for an attacker to derive the dependencies. However, the additional side-channel signal should not be created by use of a true random number generator (TRNG) or a pseudo Random noise generator (PRNG), on any other deterministic circuit. The TRNG should not be used because the output values of the TRNG can be averaged out over many runs using the same input data. For this description, a "run" is one complete process of data processing, including capturing the input data and outputting the result. For example, a run can be one of calculation of a response word as a response to a challenge word, or an encoding of an input word, or decoding of an input word, or an authentication process. A PRNG provides a signal that is deterministically dependent upon some input data used as a seed of the PRNG. The PRNG should not be used because the PRNG output could be modeled and subtracted out, even if large number PRNG values are available with a large number of possible settings. Therefore, the use of a PRNG would require keeping the structure and the parameters of the PRNG secret.

FIG. 1 illustrates device 10 in accordance with an embodiment. Device 10 may be a stand-alone IC device or part of a larger device, such as a system-on-a-chip (SoC). Device 10 includes cryptographic circuit 12, low dropout (LDO) voltage regulator 14, chaotic oscillator 16, digital-to-analog converters (DACs) 18 and 19, and counter 20. Cryptographic circuit 12 may include one or more processor cores, memory, and/or other functional blocks as illustrated in FIG. 4 and described below. Cryptographic circuit 12 has an input for receiving a data input labeled "INPUT", a clock input for receiving a clock signal labeled "CLOCK", a power supply terminal for receiving a regulator voltage labeled "VDD REG", and a data output labeled "OUTPUT." Low dropout voltage regulator 14 has an input for receiving output VCO+ from chaotic oscillator 16, and a power supply input for receiving an external power supply voltage labeled "EXTERNAL VDD", and an output for providing regulated voltage VDD REG. Chaotic oscillator 16 has a first input for receiving a control voltage labeled "VC1" from DAC 18, a second input for receiving a control voltage labeled "VC2" from DAC 19, a third input for receiving a control voltage labeled a power supply input for receiving EXTERNAL VDD, and an output for providing an output voltage labeled "VC+." Digital-to-analog converter 18 has an input coupled to receive data input INPUT, and an output for providing analog control voltage VC1. Digital-to-analog converter 19 has an input coupled to an output of counter 20, and an output for providing analog control voltage VC2. Counter 20 has an input coupled to receive the clock signal CLOCK, and an output for providing a count value to DAC 19.

Cryptographic circuit 12 may be any type of cryptographic circuit such as a cryptoprocessor, encoding or decoding circuit, a verification unit, or a data processing unit that applies digital rights management. In digital rights management, data processing is only allowed if the user is in possession of a dedicated cryptographic key. Counter 20 counts clock cycles of clock signal CLOCK and provides a count value to the input of DAC 19. DAC 19 converts the count values to analog voltages that are used to control a parameter of chaotic oscillator 16. DAC 18 converts the data input INPUT to an analog voltage and provides the analog voltage to control another parameter of chaotic oscillator 16. Note that in another embodiment, either one of DAC 18 and DAC 19 are used instead of both.

The purpose of controlling a circuit element in the chaotic oscillator is, to make sure that the properties of the oscillator output signal vary with each new clock cycle. "Properties" are here the usual properties of chaotic signals in the phase space, e.g. the number of attractors, the average time the signal stays near such an attractor, the average signal frequency, etc. For this purpose, counter 20 provides a new counter output value at each clock cycle of the whole run of the cryptographic module—so there's no accumulated counter value. Increasing or decreasing a bias voltage of an active element of the chaotic oscillator, such as an amplifier, may have an unpredictable effect. This is intended and desired to frustrate an attacker's attempt to learn, for example, a secret key from the side-channel information. The effect would only be predictable with an exact knowledge of the other elements of the oscillator.

Low dropout voltage regulator 14 is used to create an overlaid side-channel signal to confuse eavesdroppers. To accomplish this, the supply voltage EXTERNAL VDD is modulated to produce the regulated supply voltage VDD REG. The modulated supply voltage is produced using the output of the chaotic oscillator. Therefore, the modulated supply voltage VDD REG is chaotic and not predictable. Also, because the overlaid signal is produced using a chaotic oscillator, there is no algorithm for an attacker to model. In accordance with an embodiment, the signal shape of the supply voltage VDD REG is produced using the chaotic oscillator with adjustable parameters. The overlaid signal produced by the chaotic oscillator is determined by one or more of the input data, the cycle number of the clock signal, and the gain of the amplifier in the chaotic oscillator. The variable parameters provide a random analog waveform that is close to impossible to retrieve by reverse engineering the IC or the manufacturing process.

Figure 2:
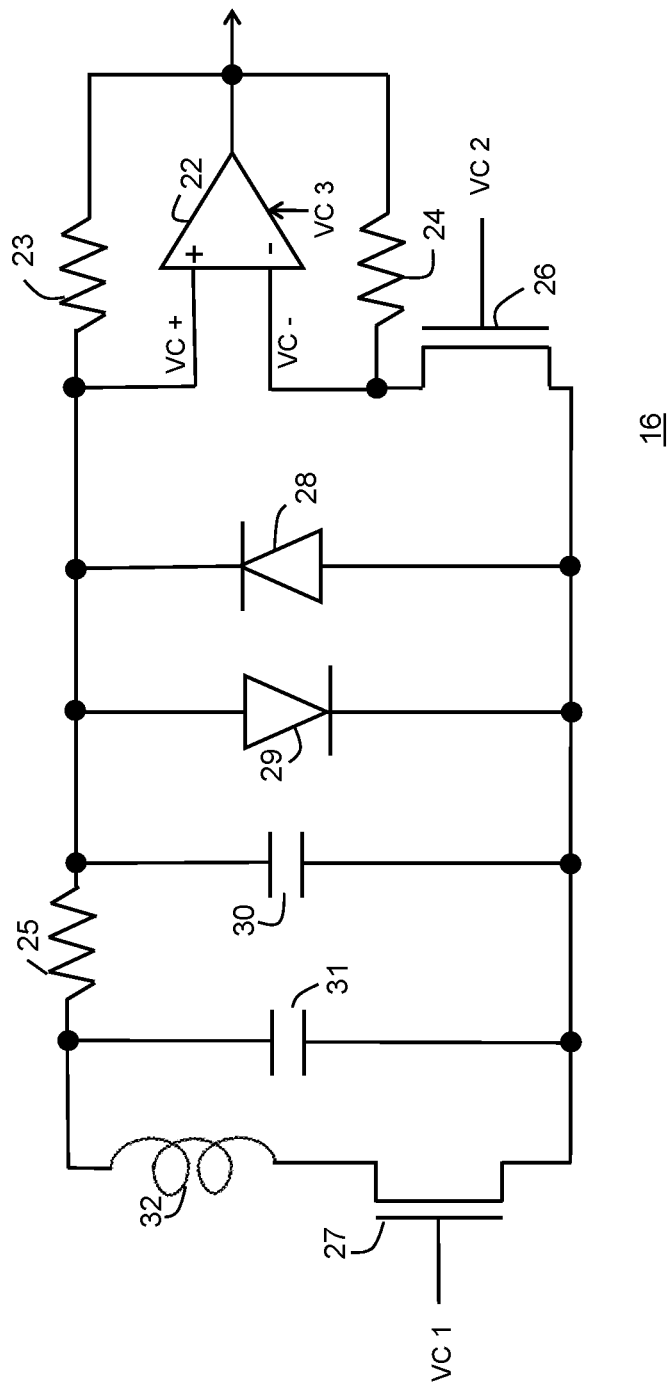
FIG. 2 illustrates the chaotic oscillator of the embodiment of FIG. 1 in more detail.

FIG. 2 illustrates chaotic oscillator 16 of the embodiment of FIG. 1 in more detail. Chaotic oscillator 16 is based on a chaotic oscillator described in a publication by Chen et al. entitled "Hidden dynamics and multi-stability in an improved third-order Chua's circuit" published in *The Journal of Engineering*, 2015, Vol. 2015, Iss. 10, pp 322-324. Chaotic oscillator 16 includes operational amplifier 22, resistors 23, 24, and 25, transistors 26 and 27, diodes 28 and 29, capacitors 30 and 31, and inductor 32. Note that transistors 26 and 27 are provided in place of resistors that were shown in the Chen et al. publication. Chaotic oscillator 16 is provided as one example of a chaotic oscillator that can be used to implement the described embodiments.

Referring back to FIG. 1, it can be seen that chaotic oscillator 16 receives several control voltages, such as for example, control voltages VC1, VC2, and VC3. Control voltage VC1 is provided to transistor 27 by DAC 18, and is the analog equivalent of the input data INPUT. Control voltage VC2 is provided to transistor 26 and is the analog equivalent voltage of the clock value of the clock signal CLOCK provided by DAC 19. Control voltage VC3 is provided to control a gain of operational amplifier 22. Control voltages VC1 and VC2 are used to vary an impedance of transistors 26 and 27. The circuit elements of chaotic oscillator 16, including transistors 26 and 27, may be implemented using any conventional semiconductor processing technology such as complementary metal-oxide semiconductor (CMOS), bipolar junction transistors (BJTs), or one or more other integrated circuit processing technologies. Control voltage VC3 may be controlled the same as control voltages VC1 and VC2, may be an average of control voltages VC1 and VC2, or may be controlled in some other way.

Figure 3:
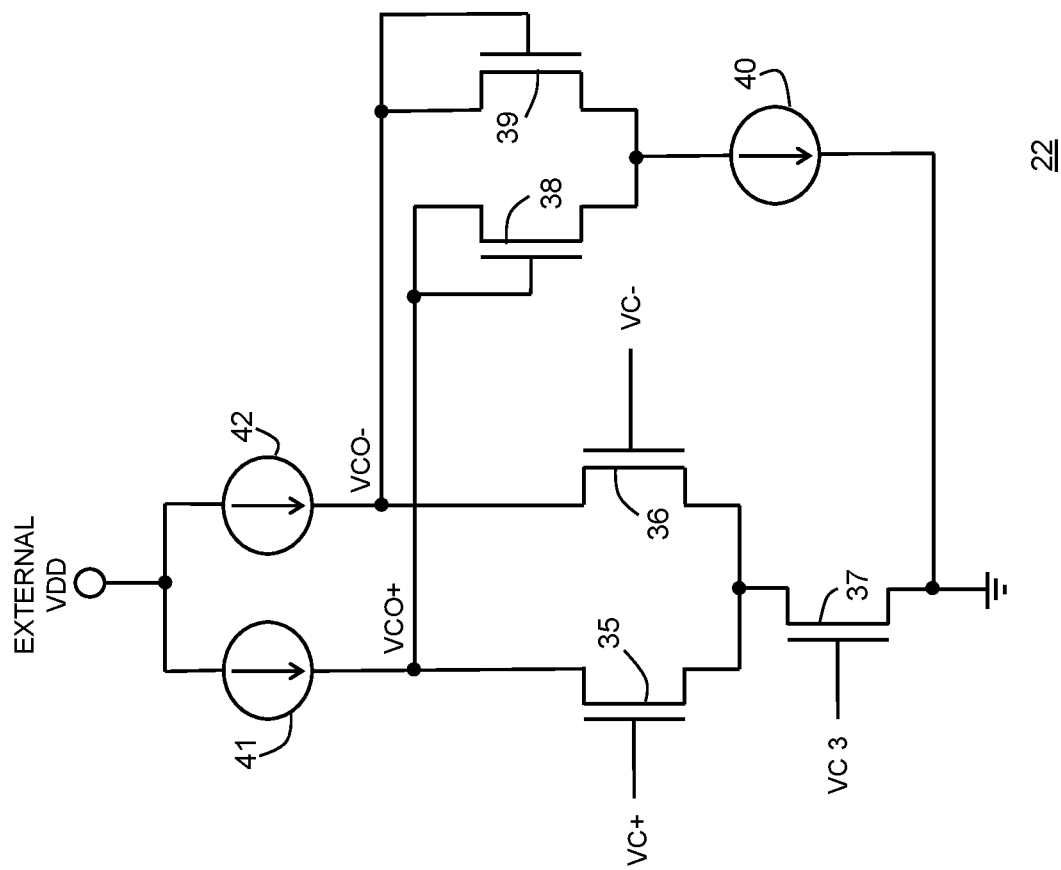
FIG. 3 illustrates an example amplifier of the chaotic oscillator in FIG. 2 in accordance with an embodiment.

FIG. 3 illustrates an example amplifier 22 of chaotic oscillator 16 of FIG. 2 in accordance with an embodiment. Amplifier 22 is illustrated as a simple operational amplifier with common mode feedback. In another embodiment, amplifier 22 may be implemented differently. Amplifier 22 includes transistors 35, 36, 37, 38, and 39, and current sources 40, 41, and 42. Transistors 35 and 36 receive differential input voltages VC+ and VC−, and amplifier 22 is coupled between supply voltage EXTERNAL VDD and ground. Transistor 37 is controlled with control voltage VC3 to control a gain. Control voltage VC3 may be provided by control voltage VC1, VC2, or a combination of VC1 and VC2, such as an average. As can be seen in FIG. 2 and FIG. 3, the controllable circuit elements can be any resistor with one terminal connected to ground. In one embodiment, the resistors are replaced by a field-effect transistor (FET).

FIG. 4 illustrates a data processing system for use in implementing cryptographic circuit 12 in accordance with an embodiment. Generally, in operation, device 10 provides side-channel protection to cryptographic circuit 12. Cryptographic circuit 12 may be implemented on one or more integrated circuits. Cryptographic circuit 12 includes bus 52. Connected to bus 52 is one or more processor(s) 54, system memory 56, secure element 58, random number generator 60, and co-processor 62. The one or more processor(s) 54 may include any hardware device capable of executing instructions stored in system memory 56. For example, processor(s) 54 may be used to execute code in sensitive applications for payment or other secure transactions. Processor(s) 54 may be, for example, a microprocessor, field programmable gate array (FPGA), application-specific integrated circuit (ASIC), or similar device. Processor(s) 54 also includes a memory such as an embedded DRAM 55 which may also be called an on-chip RAM (OCRAM). As shown in FIG. 4, embedded DRAM 55 is implemented on the same integrated circuit as processor 54 and is embedded within the circuitry of the processor so that there is no easy access to input and output ports of the embedded DRAM. Typically, embedded DRAM 55 is used for storing program code, data, or as a cache.

System memory 56 may be any kind of memory, such as for example, L1, L2, or L3 cache. In one embodiment, system memory 56 is a dynamic random-access memory (DRAM). In one embodiment, system memory 56 may be, for example, a DIMM (dual-in line memory) or a DDR (double data rate random access memory) that includes one or more integrated circuits. Note that system memory 56 generally has many times more storage capacity than embedded DRAM 55.

Secure element 58 may be a secure hardware element for tamper resistance and provides a layer of security from attacks. Secure element 58 may also include a processor for running sensitive applications, such as payment applications.

Co-processor 62 is bi-directionally connected to bus 52. Co-processor 62 may be a special type of one or more co-processors optimized for running encryption/decryption security software according to AES, DES, or other type of encryption algorithm. Also, in one embodiment, a hypervisor may be implemented using co-processor 62. An algorithm executed on co-processor 62 may be used to encrypt/decrypt data and instructions. Alternatively, co-processor 62 be used for another purpose, such as graphics processing.

Random number generator 60 may be a pseudo random number generator and may be used to provide, for example, random numbers for use in, for example, generating encryption/decryption keys and the like. Random number generator 60 may also be used to generate a random permutation order for permuting a portion of the system memory in accordance with an embodiment as described herein.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A device comprising:
   a data processing circuit having an input for receiving an input signal, a power supply terminal, and an output for providing an output signal;
   a chaotic oscillator circuit having an input coupled to receive a control signal, and an output coupled to provide an output signal for controlling a voltage level of a power supply of the data processing circuit; and
   a counter having an input coupled to receive a clock signal, and an output coupled to control a variable parameter of the chaotic oscillator.

2. The device of claim 1, further comprising a digital-to-analog converter having an input coupled to the output of the counter, and an output coupled to control the predetermined parameter.

3. The device of claim 1, wherein the variable parameter is a resistance of a circuit element of the chaotic oscillator circuit.

4. The device of claim 1, wherein the variable parameter is a gain of an amplifier of the chaotic oscillator circuit.

5. The device of claim 1 further comprising a low dropout voltage regulator having an input coupled to the output of the chaotic oscillator, and an output coupled to the power supply voltage terminal of the data processing circuit.

6. The device of claim 1, wherein the data processing circuit is one of either an encryption or decryption circuit, an encoding or decoding circuit, a verification circuit, or a digital rights management processor.

7. The device of claim 1, wherein the data processing circuit operates only in response to a cryptographic key.

8. The device of claim 1, wherein the device is implemented in one or more integrated circuits.

9. The device of claim 1, wherein the chaotic oscillator circuit is an analog chaotic oscillator circuit.

10. An integrated circuit device, comprising:
    a data processing circuit having an input for receiving an input signal, a power supply terminal, and an output for providing an output signal;
    a chaotic oscillator circuit having an input coupled to receive a control signal, and an output coupled to provide an output signal for controlling a voltage level of a power supply of the data processing circuit;
    a counter having an input coupled to receive a clock signal, and an output; and
    a first digital to analog converter having an input coupled to the output of the counter, and an output coupled to control a first variable parameter of the chaotic oscillator.

11. The integrated circuit device of claim 10, further comprising a second digital to analog converter having an input coupled to receive the input signal of the data processing circuit, and an output coupled to control a second variable parameter of the chaotic oscillator.

12. The integrated circuit device of claim 10, wherein the first variable parameter comprises a resistance of a circuit element of the chaotic oscillator.

13. The integrated circuit device of claim 10, wherein the first variable parameter comprises a gain of an amplifier of the chaotic oscillator.

14. The integrated circuit device of claim 10, wherein the data processing circuit is one of either an encryption or decryption circuit, an encoding or decoding circuit, a verification circuit, or a digital rights management processor.

15. The integrated circuit device of claim 10 further comprising a low dropout voltage regulator having an input coupled to the output of the chaotic oscillator, and an output coupled to provide the power supply to the data processing circuit.

16. A method comprising:
    controlling at least in part, using a chaotic oscillator, a power supply voltage provided to a data processing circuit;
    counting a plurality of clock signals provided to the data processing circuit;
    providing a count value for each subsequent counted clock cycle of the plurality of clock signals;
    converting each count value to an analog value; and
    providing the analog value to control a variable parameter of the chaotic oscillator.

17. The method of claim 16, wherein the variable parameter is a resistance of a circuit element of the chaotic oscillator circuit.

18. The method of claim 16, wherein the variable parameter is a gain of an amplifier of the chaotic oscillator circuit.

19. The method of claim 16 further comprising providing the power supply voltage with a low dropout voltage regulator having an input coupled to an output of the chaotic oscillator, and an output coupled to a power supply voltage terminal of the data processing circuit.

20. The method of claim 16, wherein the method is performed using one or more integrated circuit devices.

* * * * *